(12) United States Patent
Zhuang et al.

(10) Patent No.: US 11,965,070 B2
(45) Date of Patent: Apr. 23, 2024

(54) COMPOSITE FILM OF 6FPBO AND TRIPLE-SHELLED MESOPOROUS SILICA HOLLOW SPHERES AND ITS PREPARATION AND USE

(71) Applicant: East China University of Science and Technology, Shanghai (CN)

(72) Inventors: Qixin Zhuang, Shanghai (CN); Zhe Zhang, Shanghai (CN); Xiaoyun Liu, Shanghai (CN); Jian Xu, Shanghai (CN); Wentao Wang, Shanghai (CN); Zeyang Wu, Shanghai (CN); Xiaohan Wu, Shanghai (CN); Lihui Li, Shanghai (CN)

(73) Assignee: East China University of Science and Technology, Shanghai (CN)

( * ) Notice: Subject to any disclaimer, the term of this patent is extended or adjusted under 35 U.S.C. 154(b) by 298 days.

(21) Appl. No.: 17/453,102

(22) Filed: Nov. 1, 2021

(65) Prior Publication Data
US 2022/0145023 A1 May 12, 2022

(30) Foreign Application Priority Data
Nov. 12, 2020 (CN) .......................... 202011261162.2

(51) Int. Cl.
| | |
|---|---|
| C08J 5/18 | (2006.01) |
| C01B 33/148 | (2006.01) |
| C08K 3/36 | (2006.01) |
| C08K 7/18 | (2006.01) |
| C08K 7/26 | (2006.01) |
| C08K 9/04 | (2006.01) |
| C08L 79/04 | (2006.01) |

(52) U.S. Cl.
CPC ............... *C08J 5/18* (2013.01); *C01B 33/148* (2013.01); *C08K 7/26* (2013.01); *C08L 79/04* (2013.01); *C01P 2004/34* (2013.01); *C01P 2006/16* (2013.01); *C08J 2339/00* (2013.01); *C08J 2379/04* (2013.01); *C08K 3/36* (2013.01); *C08K 7/18* (2013.01); *C08K 9/04* (2013.01)

(58) Field of Classification Search
CPC ....... C08G 73/22; C08L 79/04; C09D 179/04; C08J 2379/04; C08J 5/18; C08K 3/36; C08K 7/26; C01P 2004/34
See application file for complete search history.

(56) References Cited

FOREIGN PATENT DOCUMENTS

CN 110305332 A * 10/2019 ........... C08G 83/001

\* cited by examiner

*Primary Examiner* — Kregg T Brooks
(74) *Attorney, Agent, or Firm* — UB Greensfelder LLP

(57) ABSTRACT

The disclosure relates to the field of electronic materials, and in particular to a composite film of fluorinated polybenzoxazole (6FPBO) and triple-shelled mesoporous silica hollow spheres, and to its preparation and use. The composite film comprises fluorinated polybenzoxazole as a matrix and amino-functionalized triple-shelled mesoporous silica hollow spheres which are dispersed in the fluorinated polybenzoxazole matrix. A mass ratio of (amino-functionalized triple-shelled mesoporous silica hollow spheres)/(fluorinated polybenzoxazole) is 1/100 to 5/100. The composite film has excellent thermal stability and a lower dielectric constant.

8 Claims, 2 Drawing Sheets

COMPOSITE FILM OF 6FPBO AND TRIPLE-SHELLED MESOPOROUS SILICA HOLLOW SPHERES AND ITS PREPARATION AND USE

CROSS-REFERENCE TO RELATED APPLICATIONS

This patent application claims the benefit of and priority to Chinese Patent Application No. 202011261162.2 filed on 12 Nov. 2020, the disclosure of which is incorporated by reference herein in its entirety as part of the present application.

TECHNICAL FIELD

The present disclosure relates to the technical field of electronic materials, and in particular to a composite film of fluorinated polybenzoxazole (6FPBO) and triple-shelled mesoporous silica hollow spheres, and to its preparation and use.

BACKGROUND OF THE INVENTION

With the rapid development of the electronic information industry and due to new demands by 5G wireless technologies, the degree of integration of very large scale integration circuit (VLSI) devices is required to be further increased and there exists a need for their components to be miniaturized to deep submicron dimension. However, as the components further decrease in size, each of inter-wire capacitances, interlayer capacitances, and wire resistances may increase, which may increase signal delay due to them and thus limit the high speed performance of the components. Generally, transmission speed of a signal is inversely proportional to square root of dielectric constant. So, in order to avoid crosstalk, it is possible for the circuits of the high speed electronic devices to transmit a signal faster by using a dielectric material having a lower dielectric constant. For this reason, low dielectric constant materials have been extensively researched and developed in recent years.

Polybenzoxazoles (PBDs) are a class of high performance polymers containing rod-like aromatic heterocyclic units, and their molecular chains have a high degree of regularity. These structural characteristics impart excellent mechanical and thermal properties and excellent corrosion and solvent resistance to PBO. However, PBO itself has a dielectric constant of around 3 and does not qualify for an ultra low dielectric constant material which is highly desirable.

Currently, there are mainly two common methods used to reduce the dielectric constant of a given material: fluorine doping and introducing voids. For the former, on the one hand, since the fluorine atom has high electronegativity and thus has strong electron-withdrawing capability, by introducing fluorine into the material, electronic and ionic polarization of the material may be reduced. On the other hand, by introducing fluorine into the material, its degree of chain regularity may be reduced, thereby increasing the free volume thereof and thus the gap between the molecules. Due to these, the dielectric constant of the material may be lowered. However, the introduction of fluorine tends to cause the thermal stability and mechanical strength of the material to deteriorate. With the method of introducing voids, air which has a very low dielectric constant is introduced and uniformly dispersed into a matrix of the material so that air voids having a nano-size are formed therein. In this method, the size and distribution of the air voids needs to be controlled strictly. By introducing a large number of air voids into the material, the volume of air present therein may be increased and thus the dielectric constant of the material may be lowered. However, in this method, controllability, which is required for forming desired air voids, is poor. Thus, parts of the formed voids may not be in a closed state, thereby leading to problems such as stress concentration, collapse, agglomeration, and metal ion penetration. As a result, the mechanical properties of the material and the uniformity of a film formed therefrom may deteriorate.

Therefore, it is desirable to provide a PBO-based composite which has the same excellent thermal stability as PBO while having a lower dielectric constant than that.

BRIEF SUMMARY OF THE INVENTION

Among the objectives of the present disclosure are to provide a composite film of fluorinated polybenzoxazole (6FPBO) and triple-shelled mesoporous silica hollow spheres, which has excellent thermal stability and lower dielectric constant, and to provide a method of its preparation and use.

Accordingly, one of the objectives is achieved by a composite film of 6FPBO and triple-shelled mesoporous silica hollow spheres, comprising 6FPBO as a matrix and amino-functionalized triple-shelled mesoporous silica hollow spheres which are dispersed in the 6FPBO matrix, wherein, a mass ratio of (amino-functionalized triple-shelled mesoporous silica hollow spheres)/6FPBO is 1/100 to 5/100.

Another objective is achieved by a method for preparing the composite film as described above, the method comprising:

mixing the amino-functionalized triple-shelled mesoporous silica hollow spheres with 2,2-bis(3-amino-4-hydroxyphenyl)-hexafluoropropane (6FAP), terephthalic acid (TPA), polyphosphoric acid (PPA), and stannous chloride (SnCl2) to conduct an in-situ polymerization reaction so as to obtain a first intermediate product system after removal of water; and subjecting the first intermediate product system to heat treatment and then to a film formation process.

In an embodiment, the amino-functionalized triple-shelled mesoporous silica hollow spheres are prepared by:

mixing aqueous ammonia (NH3(aq)), a porogen, anhydrous ethanol, and water to form a mixture, to which tetraethyl orthosilicate (TEOS) and 1,2-bis(triethoxysilyl)ethane (BTSE) are added in three portions to conduct a sol-gel reaction so as to obtain triple-shelled silica solid spheres;

subjecting a mixture of the obtained triple-shelled silica solid spheres and water to a hydrothermal reaction and then to calcination, so as to obtain triple-shelled mesoporous silica hollow spheres; and mixing the obtained triple-shelled mesoporous silica hollow spheres with anhydrous ethanol and an amination agent for amino modification so as to obtain the amino-functionalized triple-shelled mesoporous silica hollow spheres.

In an embodiment, TEOS and BTSE are each added in three equal portions to the mixture of NH3(aq), the porogen, anhydrous ethanol, and water.

In an embodiment, the amino-functionalized triple-shelled mesoporous silica hollow spheres are mixed with 6FAP, TPA, PPA, and SnCl2 in a mixing ratio (mass ratio) of (0.0727-0.3635):(5-6):(2.27-2.30):(25.95-26.50):(0.03-0.04).

In an embodiment, the in-situ polymerization reaction is conducted under vacuum at a temperature of 90 to 95° C. for a time period of 2 to 3 h.

In an embodiment, the heat treatment, to which the first intermediate product system is subjected, is conducted in a protective gas atmosphere by heating to and maintained at 90° C. for 1 h, 130° C. for 12 h, 150° C. for 12 h, then 165° C. for 12 h, and finally 180° C. for 8 to 9 h.

In an embodiment, the film formation process to which the first intermediate product system is subjected after heat treatment is carried out under a pressure of 10 to 12 MPa at a temperature of 200 to 220° C. for a time period of 30 to 60 min.

A further objective of the present disclosure is achieved by use of the composite film as described above or prepared according to the method as described above in electronic circuit components.

Therefore, the present disclosure provides a composite film comprising 6FPBO as a matrix and amino-functionalized triple-shelled mesoporous silica hollow spheres which are dispersed in the 6FPBO matrix, wherein, a mass ratio of (amino-functionalized triple-shelled mesoporous silica hollow spheres)/6FPBO is 1/100 to 5/100. The triple-shelled mesoporous hollow structure of the silica hollow spheres has a large number of voids therein and allows the composite film to have lower dielectric constant. Moreover, the triple-shelled mesoporous silica hollow spheres can prevent collapse of the voids therein as they can provide better support for them. Further, the introduction of fluorine (F) into the matrix can also reduce the dielectric constant of the composite film, as described in the background.

The present disclosure further provides a method for preparing the composite film as described above, comprising: mixing the amino-functionalized triple-shelled mesoporous silica hollow spheres with 6FAP, TPA, PPA, and SnCl2 to conduct an in-situ polymerization reaction so as to obtain a first intermediate product system after removal of water; and subjecting the first intermediate product system to heat treatment and then to a film formation process. The in-situ polymerization reaction causes the surface of the silica spheres to be covalently bound to 6FPBO via a peptidic bond, thereby improving the compatibility therebetween and the mechanical properties and uniformity of the composite film. The starting materials employed in the method are readily available industrially, and the method can be applied on an industrial scale. This greatly promotes the use of low dielectric polymer nano-composites in the electronic circuit components.

DETAILED DESCRIPTION OF THE INVENTION

Figure 1:
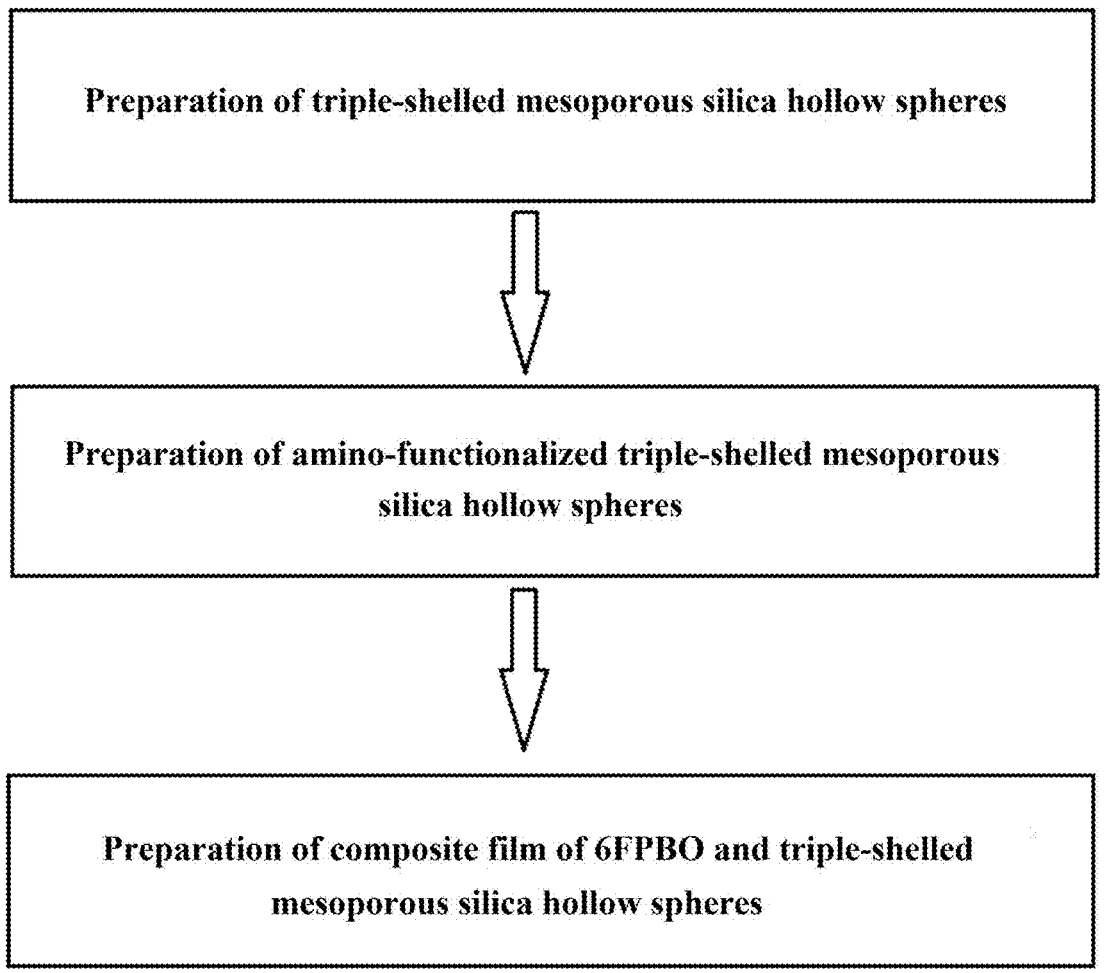
FIG. 1 shows a preparation process of the composite film of 6FPBO and triple-shelled mesoporous silica hollow spheres according to the present disclosure.
Figure 2:
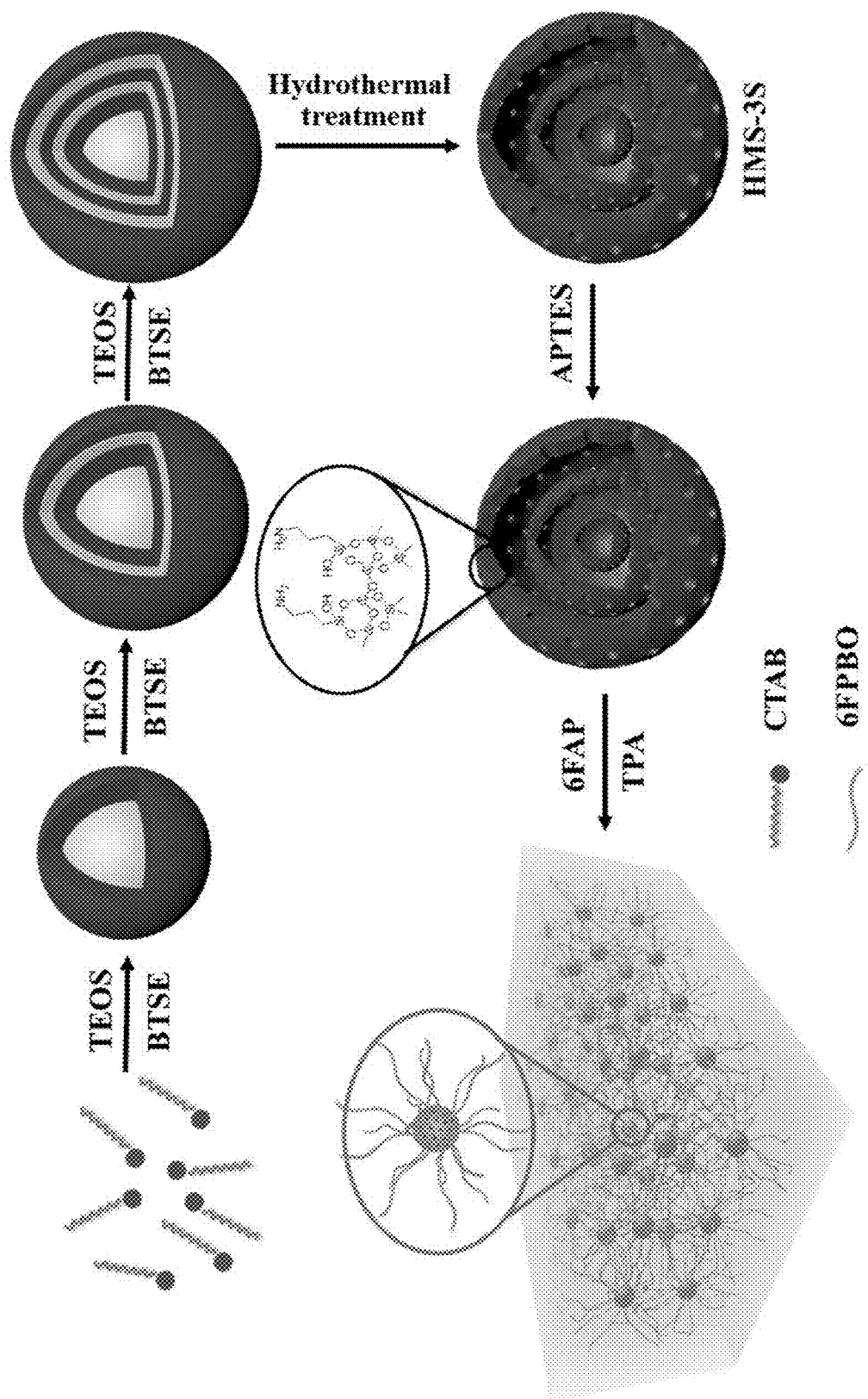
FIG. 2 illustrates in more detail the preparation process of the composite film of 6FPBO and triple-shelled mesoporous silica hollow spheres according to the present disclosure, with certain reactants and products shown in their schematic structures.

A first aspect of the present disclosure provides a composite film of fluorinated polybenzoxazole (6FPBO) and triple-shelled mesoporous silica hollow spheres, comprising 6FPBO as a matrix and amino-functionalized triple-shelled mesoporous silica hollow spheres which are dispersed in the 6FPBO matrix, wherein, a mass ratio of (amino-functionalized triple-shelled mesoporous silica hollow spheres)/6FPBO is 1/100 to 5/100.

It is noted that the term polybenzoxazole herein refers to poly(p-phenylene benzobisoxazole).

The mass ratio of (amino-functionalized triple-shelled mesoporous silica hollow spheres)/6FPBO is 1/100 to 5/100, preferably 2/100 to 4/100, more preferably 3/100.

The amino-functionalized triple-shelled mesoporous silica hollow spheres are dispersed in the 6FPBO matrix. In particular, there are peptide bonds between the amino-functionalized silica hollow spheres and the 6FPBO matrix formed through a condensation reaction of amino groups of the former with free carboxylic groups of the latter.

A second aspect of the disclosure provides a method for preparing the composite film according to the first aspect, the method comprising:
  mixing the amino-functionalized triple-shelled mesoporous silica hollow spheres with 2,2-bis(3-amino-4-hydroxyphenyl)-hexafluoropropane (6FAP), terephthalic acid (TPA), polyphosphoric acid (PPA), and stannous chloride (SnCl2) to conduct an in-situ polymerization reaction so as to obtain a first intermediate product system after removal of water; and
  subjecting the first intermediate product system to heat treatment and then to a film formation process.

All starting materials used herein are commercially available unless otherwise specified.

According to the method of the second aspect, firstly, the amino-functionalized triple-shelled mesoporous silica hollow spheres are mixed with 6FAP, TPA, PPA, and SnCl2 to conduct an in-situ polymerization reaction so as to obtain a first intermediate product system after removal of water. In an embodiment, the TPA used in this method has a particle size less than or equal to 5 μm. In an embodiment, the method further comprises, before the mixing, drying the TPA under vacuum at 95° C. for 24 h.

In an embodiment, the amino-functionalized triple-shelled mesoporous silica hollow spheres are prepared by:
  mixing aqueous ammonia (NH3(aq)), a porogen, anhydrous ethanol, and water to form a mixture, to which tetraethyl orthosilicate (TEOS) and 1,2-bis(triethoxysilyl)ethane (BTSE) are added in three portions to conduct a sol-gel reaction so as to obtain triple-shelled silica solid spheres;
  subjecting a mixture of the obtained triple-shelled silica solid spheres and water to a hydrothermal reaction and then to calcination, so as to obtain triple-shelled mesoporous silica hollow spheres; and
  mixing the obtained triple-shelled mesoporous silica hollow spheres with anhydrous ethanol and an amination agent for amino modification so as to obtain the amino-functionalized triple-shelled mesoporous silica hollow spheres.

In the preparation of the amino-functionalized triple-shelled mesoporous silica hollow spheres, firstly, after a mixture of NH3(aq), porogen, anhydrous ethanol, and water is formed, TEOS and BTSE are added thereto in three portions to conduct a sol-gel reaction so as to obtain triple-shelled silica solid spheres.

In an embodiment, the NH3(aq) has a concentration of 20 to 30% by mass, preferably 24 to 28% by mass, more preferably 28%. In an embodiment, the porogen is hexadecyl trimethyl ammonium bromide (CTAB) or hexadecyl trimethyl ammonium chloride, preferably CTAB. In an embodiment, the water used is deionized water.

In an embodiment, the NH3(aq), porogen, anhydrous ethanol, and water are mixed at a mixing ratio (mass ratio) of (1-1.5):(0.16-0.18):(30-40):(75-80), preferably 1:0.16:38:75.

In an embodiment, the NH3(aq), porogen, anhydrous ethanol, and water are mixed with stirring at room temperature. The stirring is not particularly limited and may be carried out in any conventional manner.

In an embodiment, TEOS and BTSE are added in three portions to the mixture of NH3(aq), porogen, anhydrous ethanol, and water at a temperature of 30 to 40° C., preferably 35° C. In a further embodiment, TEOS and BTSE are each added in three equal portions to the mixture. In a particular embodiment, the amount of each portion of the three equal portions of TEOS is the same as that of each portion of the three equal portions of BTSE. In an embodiment, each of the three equal portions of TEOS is added in a mass ratio of 1/1.28 to 1/1.35, preferably 1/1.28, with respect to the porogen. The manner of addition of TEOS and BTSE is not particularly limited and may be accomplished in any conventional fashion. Further, TEOS and BTSE may be added in any order.

In an embodiment, after addition of one portion of the three portions of TEOS and BTSE, the sol-gel reaction is allowed to be conducted for 18 to 24 h, preferably 20 to 22 h, at the end of which time next addition is performed.

By adding TEOS and BTSE in three portions to the mixture of NH3(aq), porogen, anhydrous ethanol, and water to conduct a sol-gel reaction, it is possible to realize shell-by-shell fabrication of triple-shelled silica solid spheres.

In an embodiment, the process for preparation of the amino-functionalized triple-shelled mesoporous silica hollow spheres further comprises: after completion of the sol-gel reaction, subjecting the resulting reaction mixture to cooling, centrifugation, washing, and drying. The cooling is not particularly limited and may be carried out in any conventional manner as long as room temperature can be achieved. In an embodiment, the centrifugation is carried out at 6,000 to 7,000 rpm, preferably 6,200 to 6,800 rpm, more preferably 6,400 to 6,500 rpm. The centrifugation time is not particularly limited as long as desired solid-liquid separation can be achieved. The washing liquid to be used at the washing is preferably anhydrous ethanol. The drying is preferably carried out in air at room temperature.

In the preparation of the amino-functionalized triple-shelled mesoporous silica hollow spheres, after the triple-shelled silica solid spheres are obtained, they are mixed with water and subjected to a hydrothermal reaction and then to calcination so as to obtain triple-shelled mesoporous silica hollow spheres. In an embodiment, the water used is deionized water. In an embodiment, the triple-shelled silica solid spheres are mixed with the water in a mixing ratio (mass ratio) of 1/150 to 1/170, preferably 1/160. In an embodiment, the triple-shelled silica solid spheres are ultrasonically mixed with the water for 1 to 2 h. The ultrasonic frequency is not particularly limited as long as the triple-shelled silica solid spheres can be uniformly dispersed in the water.

In an embodiment, the hydrothermal reaction is conducted at a temperature of 100 to 120° C., preferably 105 to 115° C., more preferably 110° C., for 5 to 7 h, preferably 6 h. During the hydrothermal reaction, multi-interface transformation occurs. In particular, the silica in regions having a relatively low degree of polymerization in each shell may be dissolved; while the silica in regions having a high degree of polymerization may be remained. As a result, triple-shelled silica hollow spheres are formed.

In an embodiment, the process for preparation of the amino-functionalized triple-shelled mesoporous silica hollow spheres further comprises: after completion of the hydrothermal reaction, subjecting the resulting reaction mixture to cooling, centrifugation, washing, and drying. The cooling is not particularly limited and may be carried out in any conventional manner as long as room temperature can be achieved. In an embodiment, the centrifugation is carried out at 8,000 to 9,000 rpm, preferably 8,200 to 8,800 rpm, more preferably 8,400 to 8,600 rpm. The centrifugation time is not particularly limited as long as desired solid-liquid separation can be achieved. The washing liquid to be used at the washing is preferably anhydrous ethanol. The drying is preferably carried out in air at room temperature.

In an embodiment, the calcination is carried out at a temperature of 500 to 600° C., preferably 520 to 580° C., more preferably 540 to 560° C., for 5 h. The temperature may be ramped from ambient temperature to the final calcination temperature at a rate of 1° C./min.

This calcination is carried out to remove the porogen present in the product resulting from the hydrothermal reaction so as to cause the triple-shelled silica hollow spheres to have a mesoporous structure.

In the preparation of the amino-functionalized triple-shelled mesoporous silica hollow spheres, after the triple-shelled mesoporous silica hollow spheres are obtained, they are mixed with anhydrous ethanol and an amination agent for amino modification so as to obtain the amino-functionalized triple-shelled mesoporous silica hollow spheres. In an embodiment, (3-aminopropyl)triethoxysilane (APTES) is used as the amination agent.

In an embodiment, the triple-shelled mesoporous silica hollow spheres are mixed with anhydrous ethanol and the amination agent in a mixing ratio (mass ratio) of (0.9-1.1):(50-55):(0.02-0.03), preferably (1-1.1):(50-55):(0.02-0.03).

In a further embodiment, the triple-shelled mesoporous silica hollow spheres are ultrasonically mixed with anhydrous ethanol, and the amination agent is then added thereto. The ultrasonic process is not particularly limited and may be carried out in any conventional manner. Similarly, the manner of addition of the amination agent is not particularly limited and may be accomplished in any conventional fashion.

In an embodiment, the amino modification is conducted at a temperature of 45 to 50° C., preferably 46 to 48° C., for 24 to 36 h, preferably 28 to 33 h.

In an embodiment, the process for preparation of the amino-functionalized triple-shelled mesoporous silica hollow spheres further comprises: after the amino modification is completed, subjecting the resulting reaction mixture to centrifugation, washing, and drying. In an embodiment, the centrifugation is carried out at 8,000 to 9,000 rpm, preferably 8,200 to 8,400 rpm. The centrifugation time is not particularly limited as long as desired solid-liquid separation can be achieved. The washing liquid to be used at the washing is preferably anhydrous ethanol. The drying is preferably carried out in air at room temperature.

In an embodiment of the method according to the second aspect of the disclosure, the amino-functionalized triple-shelled mesoporous silica hollow spheres are mixed with 6FAP, TPA, PPA, and SnCl2 in a mixing ratio (mass ratio) of (0.0727-0.3635):(5-6):(2.27-2.30):(25.95-26.50):(0.03-0.04), preferably, (0.1454-0.2908):5:2.27:25.95:0.03, more preferably 0.2181:5:2.27:25.95:0.03.

The manner of mixing of the amino-functionalized triple-shelled mesoporous silica hollow spheres with 6FAP, TPA, PPA, and SnCl2 is not particularly limited and may be accomplished in any conventional fashion.

In an embodiment of the second aspect of the disclosure, the method further comprises: before the in-situ polymerization reaction, performing vacuum evacuation and breaking of the vacuum with nitrogen gas three times in the same manner at a temperature less than or equal to 60° C., and increasing the temperature to a reaction temperature of the in-situ polymerization when nitrogen gas introduction is completed after being repeated three times and vacuum evacuation is then performed to a degree of vacuum of 0.1 MPa. In an embodiment, the in-situ polymerization reaction is conducted at a temperature of 90 to 95° C., preferably 91 to 94° C., more preferably 92 to 93° C., for 2 to 3 h.

During the in-situ polymerization reaction, PPA and SnCl2 function as a dehydrating agent and an initiator, respectively, and 6FAP and TPA as monomers undergo polycondensation to produce 6FPBO. Then, a condensation reaction occurs between free carboxylic groups of the produced 6FPBO and amino groups of the amino-functionalized triple-shelled mesoporous silica hollow spheres, so that peptide bonds, which are a covalent bond, are formed therebetween.

In an embodiment of the second aspect of the disclosure, the method further comprises: after completion of the in-situ polymerization reaction, subjecting the resulting reaction mixture to be cooled to 60° C.

In an embodiment of the method according to the second aspect of the disclosure, the removal of water after completion of the in-situ polymerization reaction is carried out by using phosphorus pentoxide (P2O5). In particular, P2O5 is added to the reaction mixture resulting from the in-situ polymerization reaction to adsorb and remove the water produced during the reaction, and vacuum evacuation and breaking of the vacuum with nitrogen gas are performed three times in the same manner. In an embodiment, a mass ratio of P2O5 to the amino-functionalized triple-shelled mesoporous silica hollow spheres is 11.6:(0.0727-0.3635), preferably 11.6:(0.1454-0.2908), more preferably 11.6: 0.2181.

According to the method of the second aspect, after the first intermediate product system is obtained, it is subjected to heat treatment and then to a film formation process so as to obtain a composite film of 6FPBO and the triple-shelled mesoporous silica hollow spheres.

In an embodiment, the heat treatment, to which the first intermediate product system is subjected, is conducted in a protective gas atmosphere by heating to and maintained at 90° C. for 1 h, 130° C. for 12 h, 150° C. for 12 h, then 165° C. for 12 h, and finally 180° C. for 8 to 9 h. The protective gas atmosphere is preferably nitrogen.

In an embodiment, the film formation process is carried out by pouring the first intermediate product system after the heat treatment onto a surface of a plate for hot pressing. In an embodiment, the film formation process is carried out under a pressure of 10 to 12 MPa, preferably 11 MPa, at a temperature of 200 to 220° C., preferably 205 to 215° C., for a time period of 30 to 60 min, preferably 40 to 50 min.

In an embodiment of the second aspect of the disclosure, the method further comprises: after completion of the film formation process, cooling the film at the film formation pressure to room temperature. The manner of cooling is not particularly limited and may be accomplished in any conventional fashion.

In an embodiment of the second aspect of the disclosure, the method further comprises: after the film is cooled or allowed to cool to room temperature, immersing the cooled film in deionized water to remove PPA therefrom, followed by drying thereof. In an embodiment, the immersion is carried out for 48 to 72 h, preferably 60 to 70 h. In an embodiment, the drying is carried out under vacuum at 60° C.

As described above, triple-shelled silica solid spheres may be first prepared by sol-gel reaction of TEOS with BTSE using CTAB or hexadecyl trimethyl ammonium chloride as a porogen, with the sol-gel process performed three times by adding TEOS and BTSE in three portions. The triple-shelled silica solid spheres may then undergo a hydrothermal reaction to produce triple-shelled mesoporous silica hollow spheres. Next, the triple-shelled mesoporous silica hollow spheres are subjected to amino-modification and then to an in-situ polymerization reaction with 6FPBO to produce a composite thereof.

A third aspect of the present disclosure provides use of the composite film according to the first aspect of the disclosure or prepared by the method according to the second aspect of the disclosure in electronic circuit components. In an embodiment, the composite film is used in the fields of packaging materials for 5G chips, avionic devices and semiconductors.

The present disclosure will now be described in further detail by way of the following examples, which, however, are not exhaustive and should not be construed as limiting the disclosure. Numerous other examples or embodiments may be envisaged without departing from the spirit and scope of the present disclosure.

Example 1

A composite film of 6FPBO and triple-shelled mesoporous silica hollow spheres was prepared according to the process as shown in FIG. 1.

76 g of anhydrous ethanol, 150 g of deionized water, 2 g of 28% aqueous ammonia, and 0.32 g of CTAB were mixed and stirred well at room temperature, and were then heated to 35° C. 0.25 g of TEOS and 0.25 g of BTSE were added thereto to conduct reaction for 18 h. 0.25 g of TEOS and 0.25 g of BTSE were again added to conduct reaction for another 18 h. Then, 0.25 g of TEOS and 0.25 g of BTSE were once again added to conduct reaction for a further 18 h. The resulting reaction mixture was cooled to room temperature and centrifuged at 6,000 rpm. The resulting solids were washed using anhydrous ethanol and dried at room temperature to obtain triple-shelled silica solid spheres.

1 g of the obtained triple-shelled silica solid spheres were ultrasonically mixed with 160 g of deionized water for 1 h and then underwent a hydrothermal reaction at 100° C. for 5 h. After cooling to room temperature, the resulting reaction mixture was centrifuged at 8,000 rpm and was then washed using anhydrous ethanol and dried at room temperature. The resulting solids were calcined at 500° C. (heating rate of 1° C./min from room temperature) for 5 h to remove CTAB and obtain triple-shelled mesoporous silica hollow spheres.

1 g of the obtained triple-shelled mesoporous silica hollow spheres were ultrasonically mixed with 50 g of anhydrous ethanol, and 0.02 g of APTES was then added thereto. The mixture was heated to 45° C. and was subjected to amino modification for 24 h and then to centrifugation at 8,000 rpm. The resulting solids were washed using anhydrous ethanol and dried at room temperature to obtain amino-functionalized triple-shelled mesoporous silica hollow spheres.

0.0727 g of the obtained amino-functionalized triple-shelled mesoporous silica hollow spheres were mixed with 5 g of 6FAP, 2.27 g of TPA (having a particle size less than or equal to 5 μm, dried under vacuum at 95° C. for 24 h before use), 25.95 g of PPA, and 0.03 g of SnCl2. Vacuum evacuation and breaking of the vacuum with nitrogen were then performed at a temperature less than 60° C. and repeated three times. The temperature was increased to 90° C. under vacuum, and an in-site polymerization reaction was then conducted for 3 h. The resulting reaction mixture was cooled to 60° C., and 11.6 g of P2O5 was added thereto to adsorb and remove the water produced during the reaction. Again, vacuum evacuation and breaking of the vacuum with nitrogen were then performed and repeated three times. Heat treatment was then performed on the reaction mixture in a nitrogen gas atmosphere by heating to and maintained at 90° C. for 1 h, 130° C. for 12 h, 150° C. for 12 h, then 165° C. for 12 h, and finally 180° C. for 8 h. Thereafter, heating was stopped, the reaction product system after the heat treatment was poured onto a surface of a plate and was hot pressed under 10 MPa at 200° C. for 30 min. After cooling to room temperature under the same pressure, a film was obtained. Then, the film was immersed in deionized water for 48 h to remove PPA therefrom, and was then dried under vacuum at 60° C. In this film, a mass ratio of the amino-functionalized triple-shelled mesoporous silica hollow spheres to the 6FPBO matrix was 1:100.

The film was subjected to dielectric constant tests at 200° C. and 1 kHz using a broadband dielectric spectrometer and to thermal stability tests using a thermogravimetric analyzer as well as to mechanical property tests using an electronic strength instrument. Test results show that the film had a dielectric constant of 2.44, an apparent thermal decomposition temperature of 516° C., a tensile strength of 71 MPa, a tensile modulus of 3.7 GPa, and an elongation at break of 2.5%.

Example 2

A composite film of 6FPBO and triple-shelled mesoporous silica hollow spheres was prepared according to the process as shown in FIG.

76 g of anhydrous ethanol, 150 g of deionized water, 2 g of 28% aqueous ammonia, and 0.32 g of CTAB were mixed and stirred well at room temperature, and were then heated to 35° C. 0.25 g of TEOS and 0.25 g of BTSE were added thereto to conduct reaction for 24 h. 0.25 g of TEOS and 0.25 g of BTSE were again added to conduct reaction for another 24 h. Then, 0.25 g of TEOS and 0.25 g of BTSE were once again added to conduct reaction for a further 24 h. The resulting reaction mixture was cooled to room temperature and centrifuged at 7,000 rpm. The resulting solids were washed using anhydrous ethanol and dried at room temperature to obtain triple-shelled silica solid spheres.

1 g of the obtained triple-shelled silica solid spheres were ultrasonically mixed with 160 g of deionized water for 2 h and then underwent a hydrothermal reaction at 120° C. for 7 h. After cooling to room temperature, the resulting reaction mixture was centrifuged at 9,000 rpm and was then washed using anhydrous ethanol and dried at room temperature. The resulting solids were calcined at 500° C. (heating rate of 1° C./min from room temperature) for 5 h to remove CTAB and obtain triple-shelled mesoporous silica hollow spheres.

1.1 g of the obtained triple-shelled mesoporous silica hollow spheres were ultrasonically mixed with 55 g of anhydrous ethanol, and 0.03 g of APTES was added thereto. The mixture was heated to 50° C. and was subjected to amino modification for 36 h and then to centrifugation at 9,000 rpm. The resulting solids were washed using anhydrous ethanol and dried at room temperature to obtain amino-functionalized triple-shelled mesoporous silica hollow spheres.

0.1454 g of the obtained amino-functionalized triple-shelled mesoporous silica hollow spheres were mixed with 5 g of 6FAP, 2.27 g of TPA (having a particle size less than or equal to 5 μm, dried under vacuum at 95° C. for 24 h before use), 25.95 g of PPA, and 0.03 g of SnCl2. Vacuum evacuation and breaking of the vacuum with nitrogen were then performed at a temperature less than 60° C. and repeated three times. The temperature was increased to 90° C. under vacuum, and an in-site polymerization reaction was then conducted for 3 h. The resulting reaction mixture was cooled to 60° C., and 11.6 g of P2O5 was added thereto to adsorb and remove the water produced during the reaction. Again, vacuum evacuation and breaking of the vacuum with nitrogen were then performed and repeated three times. Heat treatment was then performed on the reaction mixture in a nitrogen gas atmosphere by heating to and maintained at 90° C. for 1 h, 130° C. for 12 h, 150° C. for 12 h, then 165° C. for 12 h, and finally 180° C. for 8 h. Thereafter, heating was stopped, the reaction product system after the heat treatment was poured onto a surface of a plate and was hot pressed under 10 MPa at 200° C. for 30 min. After cooling to room temperature under the same pressure, a film was obtained. Then, the film was immersed in deionized water for 72 h to remove PPA therefrom, and was then dried under vacuum at 60° C. In this film, a mass ratio of the amino-functionalized triple-shelled mesoporous silica hollow spheres to the 6FPBO matrix was 2:100.

The film was subjected to dielectric constant tests at 200° C. and 1 kHz using a broadband dielectric spectrometer and to thermal stability tests using a thermogravimetric analyzer as well as to mechanical property tests using an electronic strength instrument. Test results show that the film had a dielectric constant of 2.26, an apparent thermal decomposition temperature of 525° C., a tensile strength of 86 MPa, a tensile modulus of 4.1 GPa, and an elongation at break of 2.7%.

Example 3

A composite film was prepared in the same manner as in Example 1 except that the amino-functionalized triple-shelled mesoporous silica hollow spheres were added in an amount of 0.2181 g and that, in this film, a mass ratio of the amino-functionalized triple-shelled mesoporous silica hollow spheres to the 6FPBO matrix was 3:100.

The film was subjected to dielectric constant tests at 200° C. and 1 kHz using a broadband dielectric spectrometer and to thermal stability tests using a thermogravimetric analyzer as well as to mechanical property tests using an electronic strength instrument. Test results show that the film had a dielectric constant of 2.11, an apparent thermal decomposition temperature of 527° C., a tensile strength of 98 MPa, a tensile modulus of 4.4 GPa, and an elongation at break of 2.8%.

Example 4

A composite film was prepared in the same manner as in Example 1 except that the amino-functionalized triple-shelled mesoporous silica hollow spheres were added in an amount of 0.2908 g and that, in this film, a mass ratio of the amino-functionalized triple-shelled mesoporous silica hollow spheres to the 6FPBO matrix was 4:100.

The film was subjected to dielectric constant tests at 200° C. and 1 kHz using a broadband dielectric spectrometer and to thermal stability tests using a thermogravimetric analyzer as well as to mechanical property tests using an electronic strength instrument. Test results show that the film had a dielectric constant of 1.98, an apparent thermal decomposition temperature of 528° C., a tensile strength of 77 MPa, a tensile modulus of 4.6 GPa, and an elongation at break of 2.9%.

Example 5

A composite film was prepared in the same manner as in Example 1 except that the amino-functionalized triple-shelled mesoporous silica hollow spheres were added in an amount of 0.3635 g and that, in this film, a mass ratio of the amino-functionalized triple-shelled mesoporous silica hollow spheres to the 6FPBO matrix was 5:100.

The film was subjected to dielectric constant tests at 200° C. and 1 kHz using a broadband dielectric spectrometer and to thermal stability tests using a thermogravimetric analyzer as well as to mechanical property tests using an electronic strength instrument. Test results show that the film had a dielectric constant of 1.87, an apparent thermal decomposition temperature of 533° C., a tensile strength of 107 MPa, a tensile modulus of 4.7 GPa, and an elongation at break of 3.1%.

Comparative Example 1

5 g of 6FAP, 2.27 g of TPA (having a particle size less than or equal to 5 μm, dried under vacuum at 95° C. for 24 h before use), 25.95 g of PPA, and 0.03 g of SnCl2 were mixed. Vacuum evacuation and breaking of the vacuum with nitrogen were then performed at a temperature less than 60° C. and repeated three times. The temperature was increased to 90° C. under vacuum, and an in-site polymerization reaction was then conducted for 3 h. The resulting reaction mixture was cooled to 60° C., and 11.6 g of P2O5 was added thereto to adsorb and remove the water produced during the reaction. Again, vacuum evacuation and breaking of the vacuum with nitrogen were then performed and repeated three times. Heat treatment was then performed on the reaction mixture in a nitrogen gas atmosphere by heating to and maintained at 90° C. for 1 h, 130° C. for 12 h, 150° C. for 12 h, then 165° C. for 12 h, and finally 180° C. for 8 h. Thereafter, heating was stopped, the reaction product system after the heat treatment was poured onto a surface of a plate and was hot pressed under 10 MPa at 200° C. for 30 min. After cooling to room temperature under the same pressure, a film was obtained. Then, the film was immersed in deionized water for 72 h to remove PPA therefrom, and was then dried under vacuum at 60° C. The finally obtained film was composed only of 6FPBO.

The film was subjected to dielectric constant tests at 200° C. and 1 kHz using a broadband dielectric spectrometer and to thermal stability tests using a thermogravimetric analyzer as well as to mechanical property tests using an electronic strength instrument. Test results show that the film had a dielectric constant of 2.73, an apparent thermal decomposition temperature of 510° C., a tensile strength of 65 MPa, a tensile modulus of 3.4 GPa, and an elongation at break of 2.3%.

Comparative Example 2

2 g of 4,6-diaminoresorcinol dihydrochloride, 1.56 g of TPA (having a particle size less than or equal to 5 μm, dried under vacuum at 95° C. for 24 h before use), 8.39 g of PPA, and 0.01 g of SnCl2 were mixed. Vacuum evacuation and breaking of the vacuum with nitrogen were then performed at a temperature less than 60° C. and repeated three times. The temperature was increased to 90° C. under vacuum, and an in-site polymerization reaction was then conducted for 3 h. The resulting reaction mixture was cooled to 60° C., and 5.65 g of P2O5 was added thereto to adsorb and remove the water produced during the reaction. Again, vacuum evacuation and breaking of the vacuum with nitrogen were then performed and repeated three times. Heat treatment was then performed on the reaction mixture in a nitrogen gas atmosphere by heating to and maintained at 90° C. for 1 h, 130° C. for 12 h, 150° C. for 12 h, then 165° C. for 12 h, and finally 180° C. for 8 h. Thereafter, heating was stopped, the reaction product system after the heat treatment was poured onto a surface of a plate and was hot pressed under 10 MPa at 200° C. for 30 min. After cooling to room temperature under the same pressure, a film was obtained. Then, the film was immersed in deionized water for 72 h to remove PPA therefrom, and was then dried under vacuum at 60° C. The finally obtained film was composed only of PBO.

The film was subjected to dielectric constant tests at 200° C. and 1 kHz using a broadband dielectric spectrometer and to thermal stability tests using a thermogravimetric analyzer as well as to mechanical property tests using an electronic strength instrument. Test results show that the film had a dielectric constant of 2.91, an apparent thermal decomposition temperature of 610° C., a tensile strength of 150 MPa, a tensile modulus of 2.5 GPa, and an elongation at break of 7.7%.

The comparison of the test results for Examples 1 to 5 with those of Comparative Examples 1 and 2 indicates that the composite film of 6FPBO and triple-shelled mesoporous silica hollow spheres had a lower dielectric constant than the film composed only of 6FPBO or PBO.

The descriptions above are just preferred embodiments of the disclosure. Accordingly, those skilled in the art will recognize that various changes and modifications of the embodiments described herein can be made without departing from the scope and spirit of the disclosure.

What is claimed is:

1. A composite film of fluorinated polybenzoxazole and triple-shelled mesoporous silica hollow spheres, comprising:
   fluorinated polybenzoxazole as a matrix, and
   amino-functionalized triple-shelled mesoporous silica hollow spheres, which are dispersed in the fluorinated polybenzoxazole matrix,
   wherein, a mass ratio of (amino-functionalized triple-shelled mesoporous silica hollow spheres)/(fluorinated polybenzoxazole) is 1/100 to 5/100.

2. A method for preparing the composite film according to claim 1, the method comprising:
   mixing the amino-functionalized triple-shelled mesoporous silica hollow spheres with 2,2-bis(3-amino-4-hydroxyphenyl)-hexafluoropropane, terephthalic acid, polyphosphoric acid, and stannous chloride to conduct an in-situ polymerization reaction so as to obtain a first intermediate product system after removal of water; and
   subjecting the first intermediate product system to heat treatment and then to a film formation process.

3. The method according to claim 2, wherein, the amino-functionalized triple-shelled mesoporous silica hollow spheres are prepared by:

mixing aqueous ammonia, a porogen, anhydrous ethanol, and water to form a mixture, to which tetraethyl orthosilicate and 1,2-bis(triethoxysilyl)ethane are added in three portions to conduct a sol-gel reaction so as to obtain triple-shelled silica solid spheres;

subjecting a mixture of the obtained triple-shelled silica solid spheres and water to a hydrothermal reaction and then to calcination, so as to obtain triple-shelled mesoporous silica hollow spheres; and mixing the obtained triple-shelled mesoporous silica hollow spheres with anhydrous ethanol and an amination agent for amino modification so as to obtain the amino-functionalized triple-shelled mesoporous silica hollow spheres.

4. The method according to claim 3, wherein, tetraethyl orthosilicate and 1,2-bis(triethoxysilyl)ethane are each added in three equal portions to the mixture of aqueous ammonia, the porogen, anhydrous ethanol, and water.

5. The method according to claim 2, wherein, the amino-functionalized triple-shelled mesoporous silica hollow spheres are mixed with 2,2-bis(3-amino-4-hydroxyphenyl)-hexafluoropropane, terephthalic acid, polyphosphoric acid, and stannous chloride in a mixing ratio (mass ratio) of (0.0727-0.3635):(5-6):(2.27-2.30):(25.95-26.50):(0.03-0.04).

6. The method according to claim 2, wherein, the in-situ polymerization reaction is conducted under vacuum at a temperature of 90 to 95° C. for a time period of 2 to 3 h.

7. The method according to claim 2, wherein, the heat treatment, to which the first intermediate product system is subjected, is conducted in a protective gas atmosphere by heating to and maintained at 90° C. for 1 h, 130° C. for 12 h, 150° C. for 12 h, then 165° C. for 12 h, and finally 180° C. for 8 to 9 h.

8. The method according to claim 2, wherein, the film formation process is carried out under a pressure of 10 to 12 MPa at a temperature of 200 to 220° C. for a time period of 30 to 60 min.

* * * * *